US012786359B2

(12) United States Patent
Kubota

(10) Patent No.: US 12,786,359 B2
(45) Date of Patent: Nov. 3, 2026

(54) COLOR ADJUSTMENT METHOD, PROJECTOR, AND NON-TRANSITORY COMPUTER-READABLE STORAGE MEDIUM STORING PROGRAM

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 323 days.

(21) Appl. No.: 18/413,843

(22) Filed: Jan. 16, 2024

(65) Prior Publication Data

US 2024/0244167 A1 Jul. 18, 2024

(30) Foreign Application Priority Data

Jan. 16, 2023 (JP) ................................ 2023-004298

(51) Int. Cl.
*H04N 9/31* (2006.01)

(52) U.S. Cl.
CPC ................................ *H04N 9/3147* (2013.01)

(58) Field of Classification Search
CPC ...... G03B 21/14; G03B 21/28; G03B 21/145; G03B 21/147; G03B 21/208; G03B 21/2053; H04N 9/31; H04N 9/315; H04N 9/3105; H04N 9/3141; H04N 9/3147; H04N 9/3182; H04N 9/3194
See application file for complete search history.

(56) References Cited

U.S. PATENT DOCUMENTS

| | | | | | |
|---|---|---|---|---|---|
| 8,842,222 | B2 * | 9/2014 | Iversen | H04N 9/3105 345/626 |
| 10,080,002 | B2 * | 9/2018 | Kasuga | G06K 7/1095 |
| 2018/0115754 | A1 * | 4/2018 | Naganuma | G09G 5/10 |
| 2019/0124307 | A1 * | 4/2019 | Oike | H04N 9/3194 |
| 2020/0244934 | A1 * | 7/2020 | Wu | H04N 9/3194 |
| 2021/0368150 | A1 | 11/2021 | Kubota | |

FOREIGN PATENT DOCUMENTS

| | | | |
|---|---|---|---|
| JP | 2008-233551 | A | 10/2008 |
| JP | 2010-079125 | A | 4/2010 |
| JP | 2021-182695 | A | 11/2021 |

* cited by examiner

*Primary Examiner* — Sultan Chowdhury
(74) *Attorney, Agent, or Firm* — Dority & Manning, P.A.

(57) ABSTRACT

A control section of a first projector performs automatic color adjustment that determines, based on the result of capture of a first image projected by the first projector and a second image projected by a second projector, a first correction value used to correct the color of the first image, performs manual color adjustment that accepts the operation of correcting the color of a third image produced by correcting the first image with the first correction value and projected by the first projector and determines, based on the result of the operation, a second correction value used to correct the color of the third image, updates the first correction value by performing the automatic color adjustment again when a setting condition set in advance is satisfied, and outputs the first correction value updated by performing the automatic color adjustment again and the second correction value.

20 Claims, 7 Drawing Sheets

COLOR ADJUSTMENT METHOD, PROJECTOR, AND NON-TRANSITORY COMPUTER-READABLE STORAGE MEDIUM STORING PROGRAM

The present application is based on, and claims priority from JP Application Serial Number 2023-004298, filed Jan. 16, 2023, the disclosure of which is hereby incorporated by reference herein in its entirety.

BACKGROUND

1. Technical Field

The present disclosure relates to a color adjustment method, a projector, and a non-transitory computer-readable storage medium storing a program.

2. Related Art

There is a known method for adjusting images projected by a plurality of projectors based on images captured by cameras.

For example, JP-A-2021-182695 discloses a method for controlling a display system including a first projector and a first imaging apparatus that is communicably connected to the first projector and captures a first projection image from the first projector. The method for controlling the display system includes a first generation step, a second generation step, a third generation step, and a correction step.

In the first generation step, the first projector projects a test pattern in a reference state in which the projection conditions of the first projector are so adjusted that first projection image viewed from the front side has a desired color, and the first imaging apparatus captures the first projection image corresponding to the test pattern. A captured image is thus generated as a reference image.

In the second generation step, when the color of the first projection image is adjusted again, the first projector projects the test pattern, and the first imaging apparatus captures the first projection image corresponding to the test pattern to generate a captured image as an image to be compared.

In the third generation step, correction values that correct the projection conditions are so generated that the image to be compared matches the reference image.

In the correction step, the projection conditions are corrected based on the correction values.

JP-A-2021-182695 is an example of the related art.

When the colors of images projected by a plurality of projectors are corrected by using images captured by cameras, however, colors of the captured images that can be determined to be the same color are recognized by the human eyes as different colors in some cases. After the adjustment of the colors using the images captured by the cameras, there is needs to be followed by manual adjustment of the colors.

SUMMARY

The present disclosure relates to a color adjustment method including executing a first process of determining, based on a result of capture of a first image projected by a first projector and a second image projected by a second projector, a first correction value used to correct a color of the first image; executing a second process including accepting first operation of correcting a color of a third image produced by correcting the first image with the first correction value and projected by the first projector, and determining, based on a result of the first operation, a second correction value used to correct the color of the third image; updating the first correction value by executing the first process again when a setting condition set in advance is satisfied; and outputting the first correction value updated by executing the first process again and the second correction value.

The present disclosure further relates to a projector including an optical apparatus, an imaging apparatus, and at least one processor, the at least one processor executing a first process of determining, based on a result of capture of a first image projected by the optical apparatus and a second image projected by another projector, a first correction value used to correct a color of the first image, accepting first operation of correcting a color of a third image produced by correcting the first image with the first correction value and projected by the optical apparatus, executing a second process of determining, based on a result of the first operation, a second correction value used to correct the color of the third image, updating the first correction value by executing the first process again when a setting condition set in advance is satisfied, and outputting the first correction value updated by executing the first process again and the second correction value.

The present disclosure further relates to a non-transitory computer-readable storage medium storing a program that causes a computer to execute a first process of determining, based on a result of capture of a first image projected by a first projector and a second image projected by a second projector, a first correction value used to correct a color of the first image, accept first operation of correcting a color of a third image produced by correcting the first image with the first correction value and projected by the first projector, execute a second process of determining, based on a result of the first operation, a second correction value used to correct the color of the third image, update the first correction value by executing the first process again when a setting condition set in advance is satisfied, and output the first correction value updated by executing the first process again and the second correction value.

DESCRIPTION OF EMBODIMENTS

An embodiment according to the present disclosure will be described below with reference to the drawings.

1. System Configuration

Figure 1:
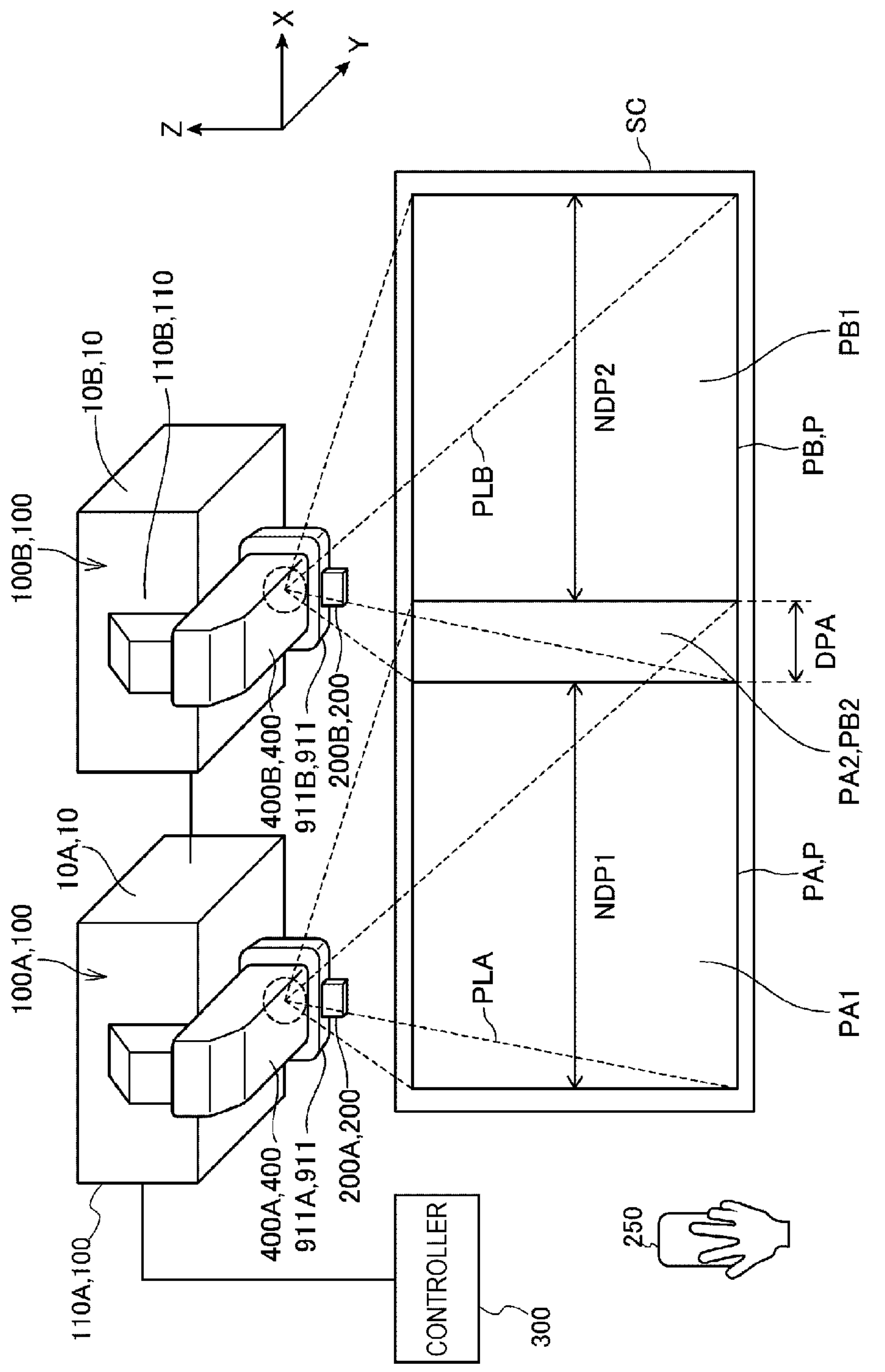
FIG. 1 shows an example of the configuration of a system according to an embodiment.

FIG. 1 shows an example of the configuration of a system according to the present embodiment.

FIG. 1 shows an X-axis, a Y-axis, and a Z-axis perpendicular to one another. The Z-axis represents the vertical direction. The X-axis and the Y-axis are parallel to the horizontal direction. The X-axis represents the rightward/leftward direction, and the Y-axis represents the frontward/rearward direction. The direction toward the positive end of the X-axis represents the rightward direction when viewed against a screen SC, the direction toward the positive end of the Y-axis represents the forward direction when viewed against the screen SC, and the direction toward the positive end of the Z-axis represents the upward direction.

The system according to the present embodiment includes a first projector 100A, a second projector 100B, and a controller 300. The controller 300, the first projector 100A, and the second projector 100B are coupled to each other via wires in the form of a daisy chain arrangement.

The controller 300 is coupled via a wire to the first projector 100A and outputs an image signal to the first projector 100A. The first projector 100A is coupled via wires to the controller 300 and the second projector 100B, and outputs the image signal input from the controller 300 to the second projector 100B. The controller 300 is, for example, a personal computer or a tablet terminal.

The present embodiment will be described with reference to the case where the controller 300, the first projector 100A, and the second projector 100B are coupled to each other via wires, and the controller 300, the first projector 100A, and the second projector 100B may instead be wirelessly coupled to each other. Still instead, the first projector 100A and the second projector 100B may each be coupled to the controller 300 via wires.

The first projector 100A operates as a primary apparatus, and the second projector 100B operates as a secondary apparatus. The first projector 100A, which operates as the primary apparatus, outputs an instruction to the second projector 100B, which is the secondary apparatus, to control the action of the second projector 100B during initial settings, which will be described later.

The first projector 100A includes a projector body 10A, an optical system unit 400A, and a first camera 200A. The projector body 10A is hung from the ceiling and installed there. The optical system unit 400A is mounted onto a mounter 105A of the projector body 10A so as to be capable of projecting image light PLA onto the screen SC. The first camera 200A is communicably connected to the projector body 10A and installed at an attachment section 911A of the optical system unit 400A so as to be capable of capturing a first projection image PA displayed on the screen SC. The first camera 200A corresponds to an imaging apparatus.

The second projector 100B includes a projector body 10B, an optical system unit 400B, and a second camera 200B. The projector body 10B is hung from the ceiling and installed there. The optical system unit 400B is mounted onto a mounter 105B of the projector body 10B so as to be capable of projecting image light PLB onto the screen SC. The second camera 200B is communicably connected to the projector body 10B and installed at an attachment section 911B of the optical system unit 400B so as to be capable of capturing a second projection image PB displayed on the screen SC.

The projector body 10A extracts image data contained in the image signal input from the controller 300, and generates the image light PLA corresponding to the extracted image data. The optical system unit 400A projects the image light PLA generated by the projector body 10A onto the screen SC. The first camera 200A captures an image of the region that is part of the screen SC and contains the first projection image PA displayed on the screen SC to generate a captured image. The generated captured image is used to adjust the colors of the first projection image PA.

The projector body 10B extracts image data contained in the image signal input from the first projector 100A, and generates the image light PLB corresponding to the extracted image data. The optical system unit 400B projects the image light PLB generated by the projector body 10B onto the screen SC. The first camera 200A captures an image of the region that is part of the screen SC and contains the second projection image PB displayed on the screen SC to generate a captured image. The generated captured image is used to adjust the colors of the second projection image PB.

FIG. 1 shows that the first projector 100A and the second projector 100B are hung from the ceiling on a user's side and installed against the screen SC, which has a rectangular shape and installed at a vertical wall. A viewer who is the user visually recognizes the images displayed on the screen SC located below the first projector 100A and the second projector 100B.

In the system configuration shown in FIG. 1, the first projection image PA and the second projection image PB are displayed side by side in the rightward-leftward direction of the screen SC, so that the tiled images are displayed in the form of a single large laterally elongated image. To display the first projection image PA and the second projection image PB in the form of tiled images, the first projector 100A and the second projector 100B project the image light PLA and the image light PLB, respectively, in such a way that an overlapping region DPA, where the first projection image PA and the second projection image PB overlap with each other, is generated.

The first projection image PA is formed of a first non-overlapping image PA1 corresponding to a first non-overlapping region NDP1 and a first overlapping image PA2 corresponding to the overlapping region DPA, as shown in FIG. 1. The first non-overlapping region NDP1 represents the region other than the overlapping region DPA out of the region corresponding to the first projection image PA. The second projection image PB is formed of a second non-overlapping image PB1 corresponding to a second non-overlapping region NDP2 and a second overlapping image PB2 corresponding to the overlapping region DPA. The second non-overlapping region NDP2 represents the region other than the overlapping region DPA out of the region corresponding to the second projection image PB.

The brightness of the first overlapping image PA2 is adjusted to be lower than the brightness of the first non-overlapping image PA1, and the brightness of the second overlapping image PB2 is adjusted to be lower than the brightness of the second non-overlapping image PB1. The brightness adjustment described above in the overlapping region DPA is called edge blending.

To display the first projection image PA and the second projection image PB side by side in the rightward-leftward direction of the screen SC so that the tiled images are displayed in the form of a single large laterally elongated image, the controller 300 supplies image data that is the source of the single large laterally elongated image to the first projector 100A.

The first projector 100A extracts the image data from the image signal supplied from the controller 300, and cuts out, in accordance with range information, image data corresponding to the range of the image projected by the first projector 100A. The image data in the cutout range is called first partial image data.

The second projector 100B extracts the image data from the image signal supplied from the first projector 100A, and cuts out, in accordance with the range information, image data corresponding to the range of the image projected by the second projector 100B. The image data in the cutout range is called second partial image data.

The range information includes the following information out of the image data: information representing the range of the image projected by the first projector 100A; and information representing the range of the image projected by the second projector 100B.

The range information is generated, for example, by an operator's operation of the controller 300. The generated range information is output from the controller 300 to the first projector 100A before the first projector 100A and the second projector 100B start projecting the images. The first projector 100A outputs the range information input from the controller 300 to the second projector 100B.

The first projector 100A and the second projector 100B have substantially the same configuration. In the following description, the first projector 100A and the second projector 100B are collectively referred to as a projector 100 when not distinguished from each other. The first projector bodies 10A and 10B are collectively referred to as a projector body 10 when not distinguished from each other. The first camera 200A and the second camera 200B are collectively referred to as a camera 200 when not distinguished from each other. The optical system units 400A and 400B are collectively referred to as an optical system unit 400 when not distinguished from each other. The image light PLA and the image light PLB are referred to as the image light PL when not distinguished from each other.

2. Configuration of Projectors

Figure 2:
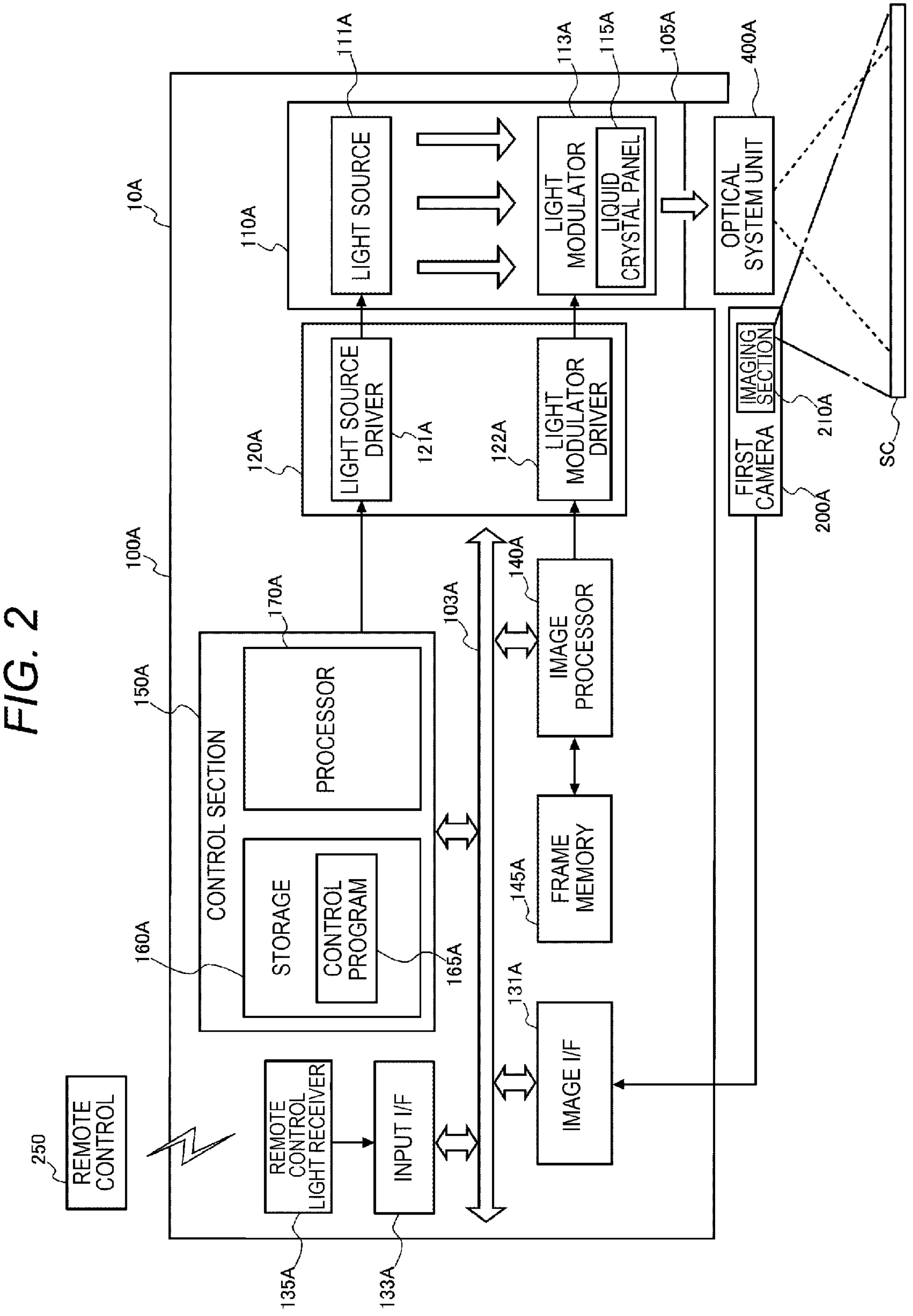
FIG. 2 is a block diagram showing an example of the configuration of a projector.

FIG. 2 shows an example of the configuration of the first projector 100A.

The configuration of the first projector 100A will be described below. The configuration of the second projector 100B is substantially the same as the configuration of the first projector 100A, and will not therefore be described.

The first projector 100A includes the projector body 10A, the optical system unit 400A, and the first camera 200A.

The projector body 10A includes a projection section 110A, a driver 120A, an image interface 131A, an input interface 133A, a remote control light receiver 135A, an image processor 140A, a frame memory 145A, and a control section 150A. The interfaces are each hereinafter abbreviated to an I/F. The image I/F 131A, the input I/F 133A, the image processor 140A, and the control section 150A are connected to each other via a bus 103A in a data communicable manner.

The projection section 110A includes a light source 111A and a light modulator 112A, and forms an optical image to generate the image light PL. The driver 120A includes a light source driver 121A and a light modulator driver 122A.

The light source 111A includes a lamp, such as a halogen lamp, a xenon lamp, and an ultrahigh-pressure mercury lamp, or a solid-state light source, such as an LED (light emitting diode) and a laser light source.

The light source driver 121A turns on and off the light source 111A in accordance with an instruction from the control section 150A.

The light modulator 112A includes liquid crystal panels 115A, which modulate the light passing therethrough to generate the image light PL. The liquid crystal panels 115A include a liquid crystal panel corresponding to red light, a liquid crystal panel corresponding to green light, and a liquid crystal panel corresponding to blue light. The light emitted by the light source 111A is separated into three-color light, the red light, the green light, and the blur light, which enter the liquid crystal panels 115A corresponding thereto. The image light PL having passed through each of the liquid crystal panels 115A and having therefore been modulated is combined with the others by a light combining system, such as a cross dichroic prism, and the combined image light PL exits toward the optical system unit 400A.

The light modulator driver 122A drives the light modulator 112A. The light modulator driver 122A receives image data corresponding to the primary colors of red, green, and blue from the image processor 140A, and converts the input image data into data signals suitable for the operation of the liquid crystal panels 115A. The light modulator driver 122A applies voltage to each pixel of the liquid crystal panels 115A based on the data signals as a result of the conversion to draw images in the liquid crystal panels 115A.

The optical system unit 400A is mounted onto the mounter 105A of the projector body 10A, and includes a lens, a mirror, and other components that are not shown but bring the image light PL generated by the projection section 110A into focus on the screen SC. The first camera 200A is so attached to the optical system unit 400A that the region containing the projection image P displayed on the screen SC corresponds to an imaging range. The optical system unit 400A may further include, for example, a zoom mechanism that enlarges or reduces an image to be projected onto the screen SC and a focus adjustment mechanism that performs focus adjustment. The projection section 110A and the optical system unit 400A correspond to an optical apparatus.

The first camera 200A includes an imaging section 210A and is attached to the attachment section 911A of the optical system unit 400A. The imaging section 210A includes a lens and an imaging device. The lens brings light incident thereon from the imaging range into focus at the image device. The imaging device is formed of a CCD (charge coupled device) or a CMOS (complementary metal oxide semiconductor) and generates image data.

The first camera 200A causes the imaging section 210A to capture the first projection image PA displayed on the screen SC under the control of the projector body 10A, and outputs the captured image data to the image I/F 131A of the projector body 10A.

The image I/F 131A includes a connector and an interface circuit and is coupled via wires to the controller 300, which supplies the first projector 100A with the image data, and the first camera 200A, which supplies the captured image. The image I/F 131A is, for example, a USB (universal serial bus).

The input I/F133A includes an interface circuit and is coupled to the remote control light receiver 135A. The input I/F133A is, for example, an HDMI (high-definition multimedia interface). HDMI is a registered trademark.

The remote control light receiver 135A receives an infrared signal transmitted by a remote control 250. The input I/F 133A decodes the signal received by the remote control light receiver 135A to generate an operation signal, and outputs the operation signal to control section 150A.

The frame memory 145A is a storage device including a plurality of banks. The banks each have storage capacity that allows image data corresponding to one frame to be written on the bank.

The image processor 140A develops the image data input from the controller 300 in the frame memory 145A. The image I/F 131A extracts image data from an image signal input from an external apparatus, and outputs the extracted image data to the image processor 140A.

The image processor 140A performs image processing on the image data developed in the frame memory 145A, for example, resolution conversion or resizing, distortion correction, shape correction, digital zooming, and image color tone and brightness adjustment.

The image processor 140A and the frame memory 145A are, for example, formed of an integrated circuit. The integrated circuit includes an LSI (large scale integrated circuit), an ASIC (application specific integrated circuit), a PLD (programmable logic device), an FPGA (field-programmable gate array), an SoC (system-on-a-chip), and other devices. An analog circuit may form part of the configuration of the integrated circuit, or the control section 150A and the integrated circuit may be combined with each other.

The control section 150A includes a storage 160A and a processor 170A.

The storage 160A includes a volatile storage device and a nonvolatile storage device.

The volatile storage device is formed, for example, of a RAM (random access memory). The nonvolatile storage device is formed, for example, of a ROM (read only memory), a flash memory, or an EEPROM (electrically erasable programmable read-only memory).

The volatile storage device is used as an arithmetic operation region of the processor 170A.

The non-volatile storage device stores a control program executed by the processor 170A and first, second, third, and fourth correction values generated by automatic color adjustment or manual color adjustment, which will be described later.

The processor 170A is an arithmetic operation processing device including a CPU (central processing unit), an MPU (micro-processing unit), or any other processor. The processor 170A may be formed of a single processor or a plurality of processors. The processor 170A may be formed of an SoC integrated with part or entirety of the storage 160A and other circuits. The processor 170A may instead be formed of a combination of a CPU that executes a program and a DSP (digital signal processor) that performs predetermined arithmetic operation processing. Furthermore, the entire functions of the processor 170A may be implemented in hardware or may be implemented by using a programmable device.

The first projector 100A performs initial adjustment when powered on. In the initial adjustment, the projection conditions are so adjusted that the state of the image displayed on the screen SC is the state desired by the viewer. The initial adjustment includes color adjustment that matches the colors of the projection image projected by the first projector 100A to the colors of the projection image projected by the second projector 100B, and the edge blending described above.

The color adjustment includes automatic color adjustment and manual color adjustment.

The automatic color adjustment is performed when the first projector 100A has not performed the automatic color adjustment or when correction data generated by the automatic color adjustment has not been stored in the storage 160A. Instead, the automatic color adjustment is performed when a setting condition set in advance is satisfied. In the present embodiment, when a set period set in advance has elapsed since the generation of the first and third correction values, the first projector 100A performs the automatic color adjustment again. For example, the automatic color adjustment may be performed again when the cumulative operation period since the generation of the first and third correction values reaches a set period. The present embodiment will be described with reference to a case where the first projector 100A, which is the primary apparatus, performs the automatic color adjustment, and the second projector 100B, which is the secondary apparatus, or the controller 300 may perform the automatic color adjustment.

In the automatic color adjustment, correction data used to correct the colors of the projection images projected onto the screen SC by the first projector 100A and the second projector 100B are generated. The correction data used to correct the colors of the first projection image PA projected by the first projector 100A is referred to as first correction data, and the correction data used to correct the colors of the second projection image PB projected by the second projector 100B is referred to as third correction data.

In the automatic color adjustment, the first camera 200A of the first projector 100A captures an image of the screen SC on which a test pattern has been projected by the first projector 100A to generate a first captured image. The test pattern includes, for example, a multi-grayscale brightness pattern for each of the RGB colors, that is, red, green, and blue.

Similarly, the first camera 200A of the first projector 100A captures an image of the screen SC on which the test pattern has been projected by the second projector 100B to generate a second captured image. The first projector 100A compares the first and second captured images with each other to generate the first and third correction data.

The manual color adjustment will next be described. In the manual color adjustment, the colors of the projection images P projected onto the screen SC by the first projector 100A and the second projector 100B are corrected by the operator's manual operation. The manual color adjustment is performed by either or both of the first projector 100A and the second projector 100B.

Figure 3:
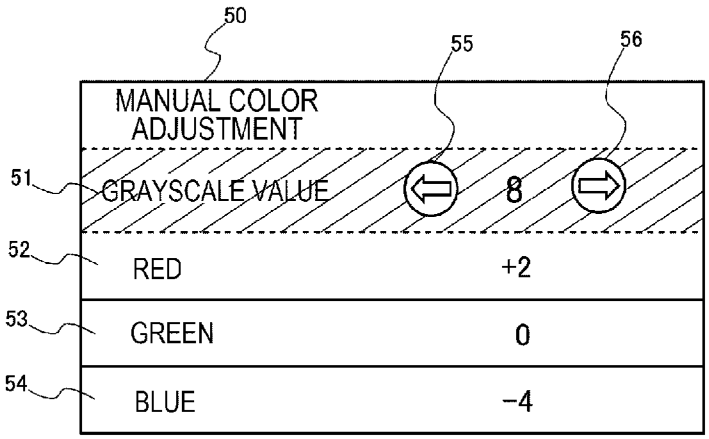
FIG. 3 shows an example of an operation screen.

FIG. 3 shows an example of an operation screen 50, which the first projector 100A displays on the screen SC during the manual color adjustment.

The manual color adjustment performed by the first projector 100A will be described below.

The control section 150A first displays the operation screen 50 on the screen SC.

The operation screen 50 will now be described with reference to FIG. 3. The operation screen 50 displayed during the manual color adjustment performed by the first projector 100A corresponds to a user interface that accepts first operation. The operation screen 50 displayed during the manual color adjustment performed by the second projector 100B corresponds to a user interface that accepts second operation.

The operation screen 50 includes a grayscale value display field 51, a red display field 52, a green display field 53, and a blue display field 54. A grayscale value selected by the operator is displayed in the grayscale value display field 51. The operation screen 50 further displays a first manipulator 55 and a second manipulator 56. Since the operation screen 50 shown in FIG. 3 shows a state in which the grayscale value display field 51 is selected, the first manipulator 55 and the second manipulator 56 are displayed in the grayscale value display field 51. The first manipulator 55 is a manipulator that accepts the operation of lowering the grayscale value displayed in the grayscale value display field 51. The second manipulator 56 is a manipulator that accepts the operation of raising the grayscale value displayed in the grayscale value display field 51.

The red display field 52 displays a red grayscale value. The green display field 53 displays a green grayscale value. The blue display field 54 displays a blue grayscale value.

When the red display field 52 is selected by the operator's operation, the first manipulator 55 and the second manipulator 56 are displayed in the red display field 52. Similarly, when the green display field 53 is selected, the first manipulator 55 and the second manipulator 56 are displayed in the green display field 53, and when the blue display field 54 is selected, the first manipulator 55 and the second manipulator 56 are displayed in the blue display field 54.

For example, when the first manipulator 55 is operated in the state in which the red display field 52 is selected, the red grayscale value is lowered. When the second manipulator 56 is operated in the state in which the red display field 52 is selected, the red grayscale value is raised.

Similarly, when the first manipulator 55 is operated in the state in which the green display field 53 is selected, the green grayscale value is lowered. When the second manipulator 56 is operated in the state in which the green display field 53 is selected, the green grayscale value is raised.

Similarly, when the first manipulator 55 is operated in the state in which the blue display field 54 is selected, the blue grayscale value is lowered. When the second manipulator 56 is operated in the state in which the blue display field 54 is selected, the blue grayscale value is raised.

In the manual color adjustment, the first projector 100A projects, for example, a test pattern having red, green, and blue patterns onto the screen SC. The projected test pattern is an image based on image data corrected by using the first correction value, and is a pattern having grayscale values selected by the operator. The test pattern corresponds to a third image. The test pattern is what is called a solid pattern in which the colors and brightness values of the image do not change. For example, the manual adjustment allows the operator to select eight-level grayscale values as the grayscale values of the test pattern. The grayscale values selected by the operator's operation of the remote control 250 are called selected grayscale values.

The operator visually recognizes the test pattern displayed on the screen SC and selects at least one of red, green, and blue by operating the remote control 250. The color selected by the operator is called a selected color. The operator operates the remote control 250 to set the amount of increase or decrease by which the grayscale value of the selected color is increased or decreased. The first projector 100A generates a test pattern in which the grayscale value of the selected color is changed by the set amount of increase or decrease, and displays the generated test pattern on the screen SC again.

When the finalization button of the remote control 250 is pressed, the first projector 100A associates the selected grayscale value with the amount of increase or decrease in the grayscale value for each of red, green, and blue, and stores the result of the association in the storage 160A. The selected grayscale value and the amount of increase or decrease in the grayscale value for each of red, green, and blue correspond to the second correction value.

When performing the manual color adjustment, the second projector 100B performs the manual color adjustment, as the first projector 100A does, to generate the fourth correction value. The test pattern projected onto the screen SC by the second projector 100B through the manual color adjustment corresponds to a fourth image.

In the manual color adjustment performed by the first projector 100A, accepting the operation of changing the grayscale value corresponds to accepting the first operation. In the manual color adjustment performed by the second projector 100B, accepting the operation of changing the grayscale value corresponds to accepting the second operation.

The reason for performing the manual color adjustment after performing the automatic color adjustment will next be described.

In the automatic color adjustment of related art, which adjusts the colors of the first projection image PA and the second projection image PB by using images captured by the camera 200, it is difficult to accurately correct color shifts due to systematic errors. The systematic errors are caused by variation in the spectral sensitivity of the color filter of the camera 200 or variation in the spectrum of the light from the light source 111 of the projector 100.

Due to the systematic errors, even when comparison between the first captured image, which is the result of capture of the first projection image PA, and the second captured image, which is the result of capture of the second projection image PB, shows that the first and second captured images have the same color, the human eyes recognize that the two captured images have slightly different colors. This color error is not improved no matter how many times the automatic color adjustment is repeated. Therefore, in the present embodiment, the manual color adjustment using human eyes is performed after performing the automatic color adjustment.

The first and third correction values generated by the automatic color adjustment are deleted from a storage 160 whenever a set period set in advance elapses. Performing the automatic color adjustment again causes the storage 160 to store new first and third correction values.

The second and fourth correction values generated by the manual color adjustment are, once generated, stored in the storage 160 and are not deleted. That is, even when the first and third correction values are updated by the automatic color adjustment, the second and fourth correction values having the same values are used.

When the first and third correction values updated by the automatic color adjustment significantly differ from each other, correcting the image data by using the second and fourth correction values generated by the manual color adjustment still seems to produce the color error between the first projection image PA and second projection image PB.

However, since the error caused by the automatic color adjustment results from the systematic errors, the first and third correction values generated by the automatic color adjustment do not change significantly. Therefore, even when the image data is corrected by using the second and fourth correction values generated at the time of the initial settings, the image data can be accurately corrected, so that the first projection image PA and the second projection image PB can be accurately matched to each other in terms of color.

3. Action of First Projector

Figure 4:
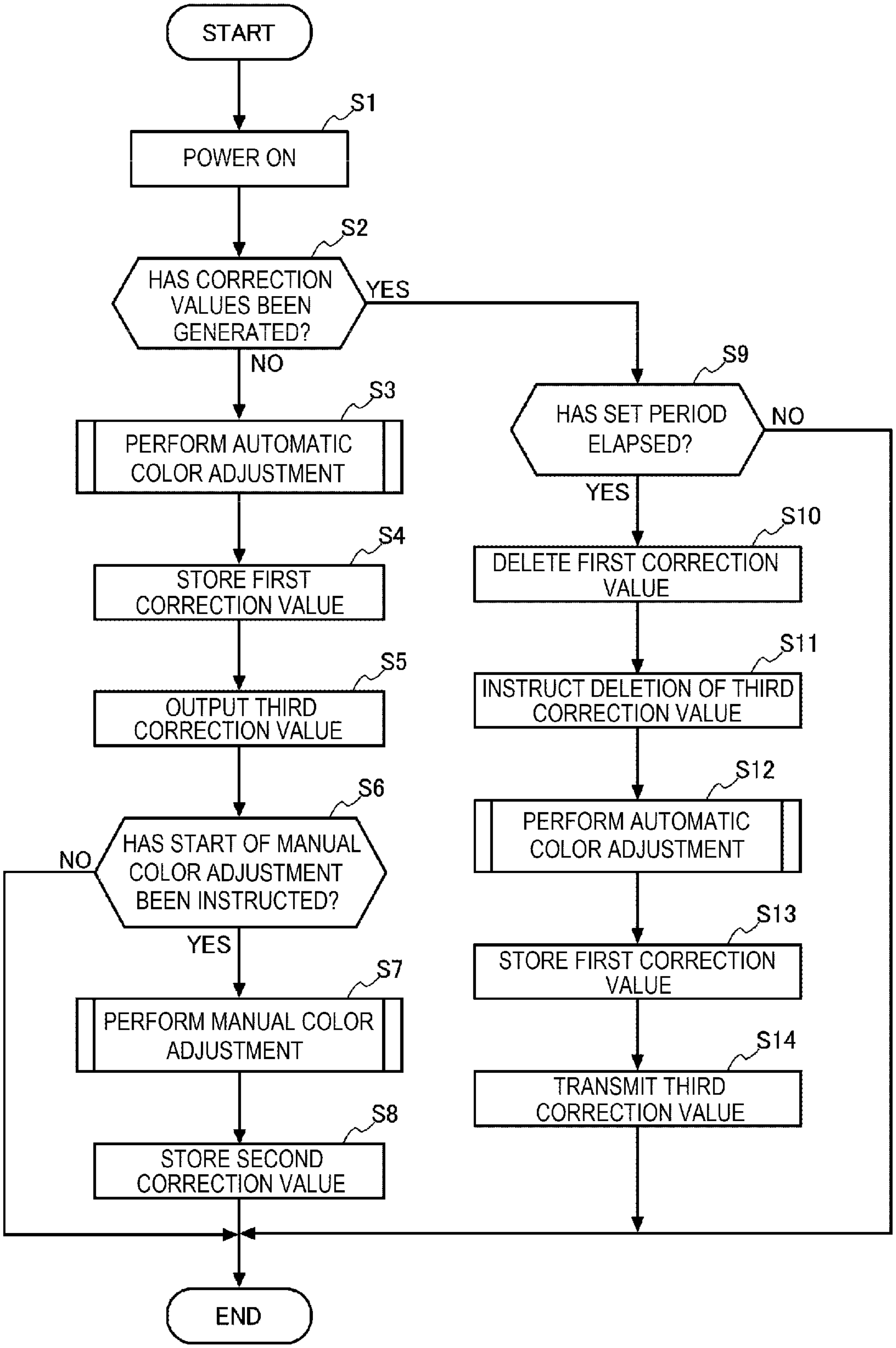
FIG. 4 is a flowchart showing the action of a first projector.

FIG. 4 is a flowchart showing the action of the first projector 100A, which is the primary apparatus. The action of the first projector 100A will be described with reference to the flowchart shown in FIG. 4.

When the first projector 100A is powered on (YES in step S1), the control section 150A evaluates whether the correction values for the color adjustment has been generated by the automatic color adjustment (step S2). That is, the control section 150A evaluates whether the correction values generated by performing the automatic color adjustment have been stored in the storage 160A.

When the correction values have not been generated yet (NO in step S2), the control section 150A performs the automatic color adjustment (step S3) to generate correction values for the color adjustment. The automatic color adjustment will be described in detail with reference to the flowchart shown in FIG. 5. Step S3 corresponds to executing a first process. The control section 150A performs the automatic color adjustment to generate the first correction value used to correct the first partial image data projected by the first projector 100A and the third correction value used to correct the second partial image data projected by the second projector 100B. The control section 150A causes the storage 160A to store the generated first correction value (step S4), and outputs the generated third correction value to the second projector 100B (step S5).

The control section 150A then evaluates whether the start of the manual color adjustment has been instructed (step S6). Specifically, the control section 150A evaluates whether an operation signal that instructs the start of the manual color adjustment has been input from a remote control light receiver 135A via the input I/F 133A. When the start of the manual color adjustment has not been instructed (NO in step S6), the control section 150A terminates thee process procedure.

When the start of the manual color adjustment is instructed (YES in step S6), the control section 150A performs the manual color adjustment (step S7), and causes the storage 160A to store the second correction value generated by the manual color adjustment (step S8). Step S7 corresponds to executing a second process. When the control section 150A performs the manual color adjustment and causes the storage 160A to store the second correction value, the control section 150A operates in accordance with the flowchart shown in FIG. 7. That is, the control section 150A waits until the image signal is input from the controller 300.

The action of the first projector 100A performed when the correction values have been generated will next be described.

When the first and second correction values have been generated (YES in step S2), the control section 150A evaluates whether the setting period set in advance has elapsed since the automatic color adjustment was previously performed to generate the first correction value (step S9).

When the setting period set in advance has not elapsed (NO in step S9), the control section 150A terminates the process procedure.

When the setting period set in advance has elapsed (YES in step S9) the control section 150A deletes the first correction value stored in the storage 160A from the storage 160A (step S10). The control section 150A instructs the second projector 100B to delete the third correction value (step S11).

The control section 150A then performs the automatic color adjustment (step S12) to generate correction values for the color adjustment. The automatic color adjustment will be described in detail with reference to the flowchart shown in FIG. 5. Step S12 corresponds to executing the first process described above again when the setting condition set in advance is satisfied to update the first correction value described above.

The control section 150A performs the automatic color adjustment to generate the first correction value used to correct the first partial image data projected by the first projector 100A and the third correction value used to correct the second partial image data projected by the second projector 100B. The control section 150A causes the storage 160A to store the generated first correction value (step S13), and outputs the generated third correction value to the second projector 100B (step S14). When the control section 150A performs the manual color adjustment and causes the storage 160A to store the second correction value, the control section 150A operates in accordance with the flowchart shown in FIG. 7. That is, the control section 150A waits until the image signal is input from the controller 300. Steps S13 and S14 correspond to outputting the first and third correction values described above.

Figure 5:
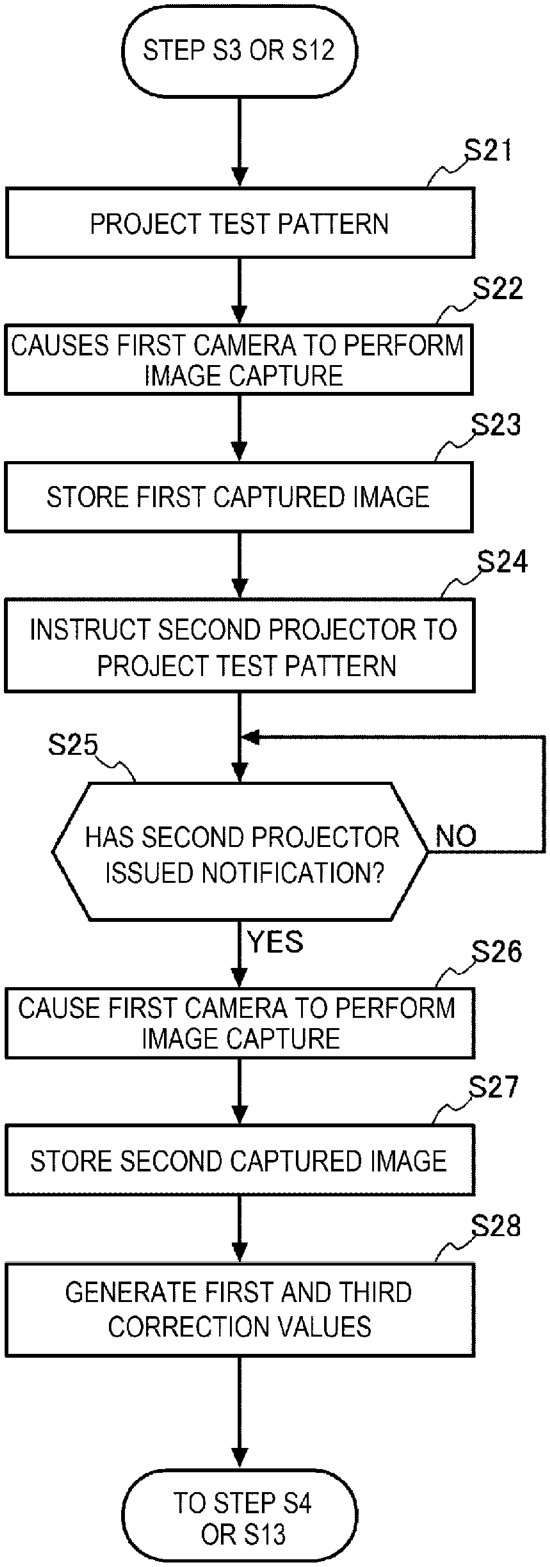
FIG. 5 is a flowchart showing automatic color adjustment.

FIG. 5 is a flowchart showing the action of the first projector 100A that performs the automatic color adjustment.

The automatic color adjustment will be described in detail with reference to the flowchart shown in FIG. 5.

The control section 150A first causes the projection section 110A to generate the image light PLA corresponding to the test pattern, and causes the optical system unit 400A to project the generated image light PLA onto the screen SC. The first projection image PA corresponding to the test pattern is thus displayed on the screen SC (step S21). The projected first projection image PA corresponding to the test pattern includes, for example, a multi-grayscale brightness pattern for each of red, green, and blue. A test pattern TP is, for example, a pattern in which the colors and brightness values of the image do not change irrespective of the projection position, what is called a solid pattern. The first projection image PA corresponding to the test pattern and displayed in step S21 corresponds to a first image.

The control section 150A then causes the first camera 200A to capture an image of the screen SC on which the first projection image PA has been displayed (step S22). The control section 150A causes the storage 160A to store the captured image generated by the first camera 200A as the first captured image (step S23). The first captured image stored in the storage 160A corresponds to a result of image capture.

The control section 150A then instructs the second projector 100B to project the test pattern (step S24). The test pattern projected by the second projector 100B corresponds to a second image.

The control section 150A evaluates whether the second projector 100B has notified that the test pattern has been projected (step S25). The notification indicates that the test pattern has been projected.

When the second projector 100B has not issued the notification (NO in step S25), the control section 150A waits until the second projector 100B issues the notification.

When the second projector 100B has notified that the test pattern has been projected (YES in step S25), the control section 150A causes the first camera 200A to capture an image of the screen SC on which the first projection image PA has been displayed (step S26).

The control section 150A then causes the storage 160A to store the second captured image input from the first camera 200A (step S27). The second captured image stored in the storage 160A corresponds to the result of image capture.

The control unit 150A then generates the first correction and third correction values based on the first and second captured images (step S28). The control section 150A compares the first and second captured images with each other. The control section 150A generates the first and third correction values by comparing the colors of red, green, and blue contained in the test pattern captured in the first captured image with those in the second captured image for each grayscale.

Figure 6:
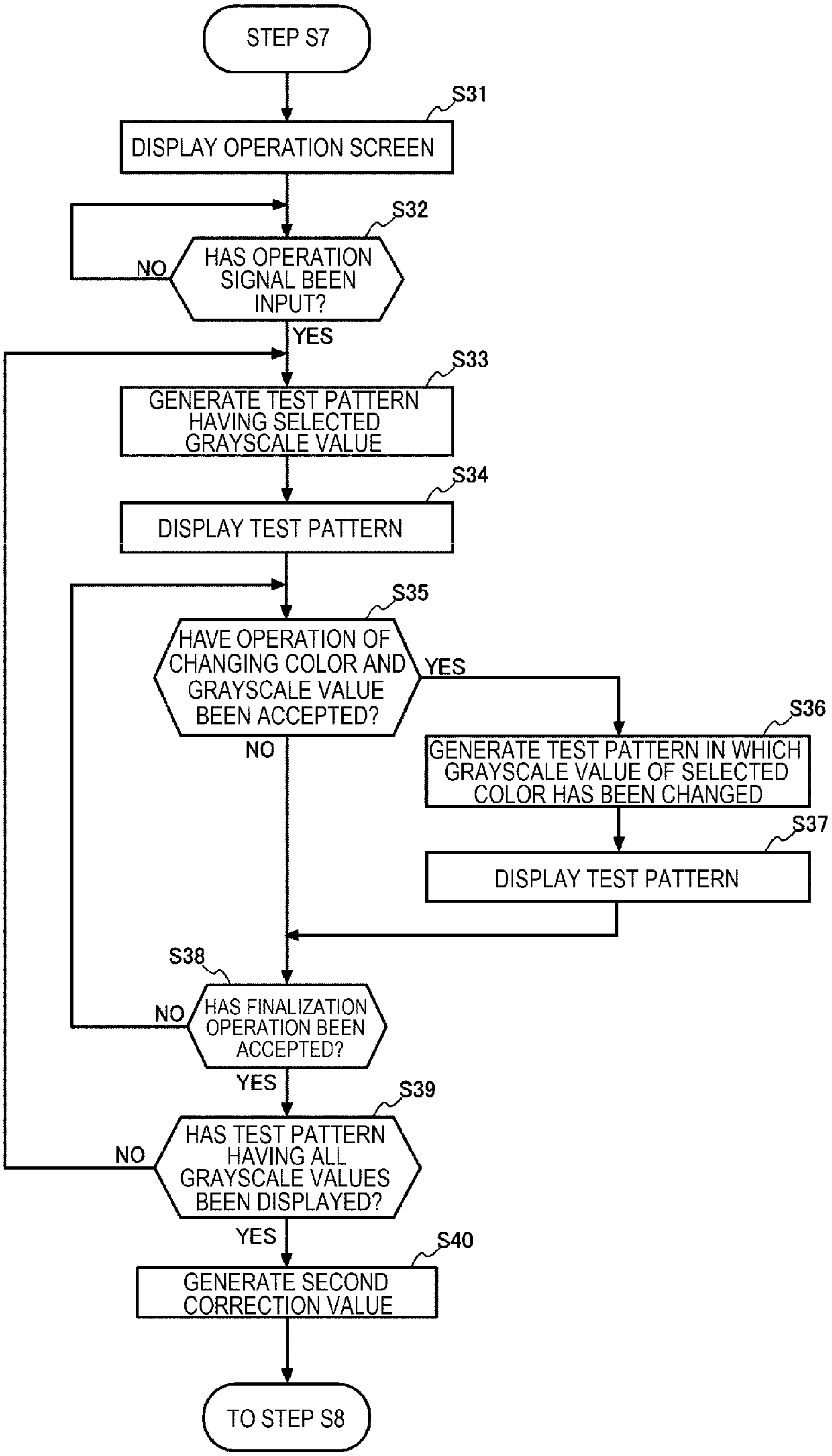
FIG. 6 is a flowchart showing manual color adjustment.

FIG. 6 is a flowchart showing the action of the first projector 100A that performs the manual color adjustment.

The manual color adjustment will be described in detail with reference to the flowchart shown in FIG. 6.

When the control section 150A starts the manual color adjustment, the control section 150A displays the operation screen 50 at the position of the screen SC (step S31). The operation screen 50 is displayed at a corner of the screen SC where the operation screen 50 does not interfere with the operation of displaying the test pattern scheduled to be displayed on the screen SC.

The control section 150A then evaluates whether an operation signal that selects a grayscale value of the test pattern has been input from the remote control light receiver 135A via the input I/F 133A (step S32). The grayscale value of the test pattern in accordance with which the manual color adjustment is performed is set in advance. In the present embodiment, 8 out of 0 to 255 grayscales are set as the grayscale value used to perform the manual color adjustment. The operator operates the remote control 250 to select the grayscale value of the pattern to be displayed as the test pattern from the set grayscale values. When the operation signal that selects a grayscale value has not been input (NO in step S32), the control section 150A waits until the operation signal that selects a grayscale value is input.

When the operation signal that selects a grayscale value is input (YES in step S32), the control section 150A generates a test pattern having the grayscale value selected by the operation signal (step S33). The test pattern generated in this process is a pattern image generated based on the image data corrected by the first correction value generated by the automatic color adjustment in step S3 shown in FIG. 4.

The control section 150A causes the projection section 110A to generate the image light PLA corresponding to the test pattern, and causes the optical system unit 400A to project the generated image light PLA onto the screen SC. The first projection image PA corresponding to the test pattern is thus displayed on the screen SC (step S34). The test pattern displayed in this process differs from the test pattern described with reference to FIG. 5 and includes, for example, a pattern having the selected single-grayscale brightness for each of red, green, and blue.

The control section 150A then evaluates whether the control section 150A has accepted the operation of selecting at least one of red, green, and blue and the operation of changing the grayscale value of the selected color (step S35). When the control section 150A has not accepted the operation of selecting at least one of the colors or the operation of changing the grayscale value of the selected color (NO in step S35), the control section 150A transitions to the evaluation in step S38.

When the control section 150A has accepted the operation of changing the grayscale value of at least one of red, green, and blue (YES in step S35), the control section 150A changes the grayscale value of the test pattern projected onto the screen SC. Specifically, the control section 150A generates a test pattern in which the grayscale value of the color selected by the accepted operation has been changed to the selected grayscale value (step S36). The control section 150A causes the projection section 110A to display the generated test pattern on the screen SC (step S37).

The control section 150A then evaluates whether the finalization button of the remote control 250 has been pressed and an operation signal corresponding to the finalization button has been input from the remote control light receiver 135A via the input I/F 133A (step S38). When the operation signal corresponding to the finalization button has not been input (NO in step S38), the control section 150A returns to the evaluation in step S35.

When the operation signal corresponding to the finalization button has been input (YES in step S38), the control section 150A generates a test pattern having the eight set grayscale values, and evaluates whether the generated test pattern has been displayed on the screen SC (step S39). When the test pattern having the eight set grayscale values is generated, but the generated test pattern has not been displayed on the screen SC (NO in step S39), the control section 150A returns to the process in step S33.

When the test pattern having the eight set grayscale values is generated, and the generated test pattern has been displayed on the screen SC (YES in step S39), the control section 150A generates the second correction value (step S40). The control section 150A generates the second correction value based on the eight grayscale values displayed as the test pattern by causing the storage 160A to store the amount of increase or decrease for each of red, green, and blue. The control section 150A then transitions to the process in the following step S8.

FIG. 6 shows the process procedure of the manual color adjustment performed by the first projector 100A, and the second projector 100B may also perform the manual color adjustment in accordance with the process procedure shown in FIG. 6 to generate the fourth correction value.

Figure 7:
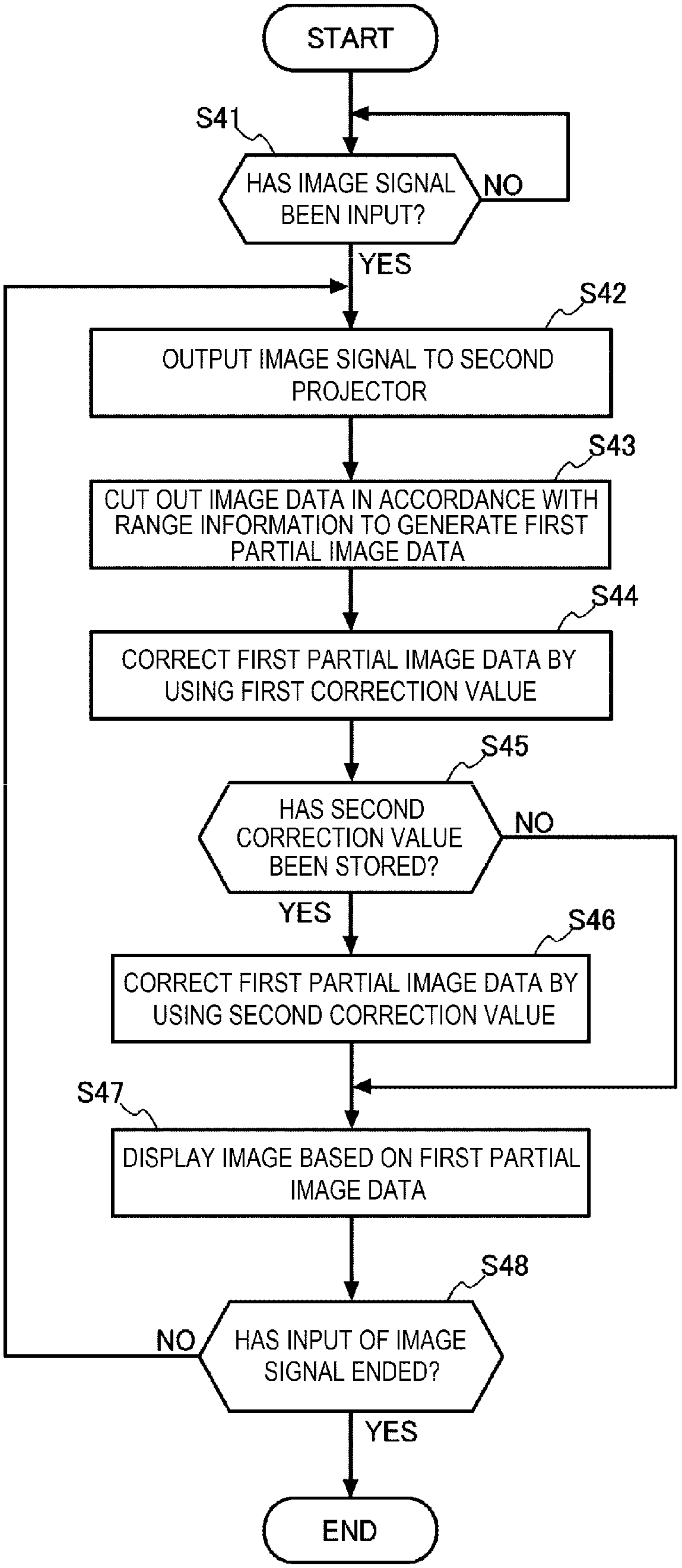
FIG. 7 is a flowchart showing the action of the first projector that performs image projection.

FIG. 7 is a flowchart showing the action of the first projector 100A that performs image projection. The action of the first projector 100A to which an image signal has been input will be described with reference to the flowchart shown in FIG. 7.

The control section 150A first evaluates whether the image signal supplied from the controller 300 has been input to the first projector 100A (step S41). When the image signal has not been input to the first projector 100A (NO in step S41), the control section 150A waits until the image signal is input.

When the image signal has been input to the first projector 100A (YES in step S41), the control section 150A outputs the input image signal to the downstream second projector 100B (step S42).

The control section 150A then extracts the image data contained in the image signal and cuts out the range of the image data to be projected by the first projector 100A. The control section 150A cuts out the range of the image data corresponding to the range information set by the initial settings to generate the first partial image data (step S43). The control section 150A corrects the first partial image data by using the first correction value (step S44).

The control section 150A then evaluates whether the second correction value has been stored in the storage 160A (step S45).

When the second correction value has not been stored in the storage 160A (NO in step S45), the control section 150A causes the projection section 110A to generate the image light PLA based on the first partial image data corrected by the first correction value. The control section 150A causes the optical system unit 400A to project the image light PLA based on the generated first partial image data to display an image based on the first partial image data on the screen SC (step S47).

When the second correction value has been stored in the storage 160A (YES in step S45), the control section 150A further corrects the first partial image data corrected by the first correction value based on the second correction value (step S46).

The control section 150A then causes the projection section 110A to generate the image light PLA based on the first partial image data corrected by the first and second correction values. The control section 150A causes the optical system unit 400A to project the image light PLA based on the generated first partial image data to display an image based on the first partial image data on the screen SC (step S47).

The control section 150A then evaluates whether the input of the image signal from the controller 300 has ended (step S48). When the input of the image signal has not ended (NO in step S48), the control section 150A returns to the process in step S42. When the input of the image signal has ended (YES in step S48), the control section 150A terminates the process procedure.

FIG. 7 shows the action of the first projector 100A that performs image projection, and the second projector 100B may also perform image projection in accordance with the process procedure shown in FIG. 7. The second projector 100B uses the third and fourth correction values.

In the description of the abovementioned flowchart, in the automatic color adjustment, the first projector 100A first displays the first projection image PA corresponding to the test pattern on the screen SC, and the first camera 200A captures an image of the screen SC to generate the first captured image. The second projector 100B then displays the second projection image PB corresponding to the test pattern on the screen SC, and the first camera 200A captures an image of the screen SC to generate the second captured image.

As an action other than the actions described above, the first projection image PA and the second projection image PB corresponding to the test pattern may be displayed on the screen SC, and an image of the screen SC on which the first projection image PA and the second projection image PB have been displayed may be captured to generate a captured image.

4. Other Embodiments

The embodiment described above is a preferable embodiment. The present disclosure is, however, not limited to the embodiment described above, and a variety of variations are conceivable to the extent that the variations do not depart from the substance of the present disclosure.

For example, the abovementioned flowchart shown in FIG. 4 describes the case where it is determined in step S9 whether the set period has elapsed as the setting condition set in advance under which the automatic color adjustment is performed again. As another example of the setting condition, it may be determined that the setting condition is satisfied when a signal that instructs performing the automatic color adjustment again is accepted from an external apparatus such as the controller 300. Instead, the automatic color adjustment may be performed again when the first projector 100A is connected to a network that is not shown and accepts a signal that instructs performing the automatic color adjustment again from a server apparatus connected to the network.

Still instead, the automatic color adjustment may be performed again, for example, whenever the first projector 100A or the second projector 100B is powered on.

The aforementioned embodiment has been described with reference to the action in which the first projector 100A, which is the primary apparatus, generates the first, second, and third correction values.

The apparatus that generates the correction values is, however, not limited to the projector 100. For example, the controller 300 may acquire the first and second captured images from the first projector 100A and generate the first and third correction values.

The controller 300 may cause a display panel thereof to display the operation screen 50, and instruct the first projector 100A to use a specific grayscale value of the first projection image PA to be displayed as the test pattern. Similarly, the controller 300 may instruct the second projector 100B to use a specific grayscale value of the second projection image PB to be displayed as the test pattern. The controller 300 generates the second and fourth correction values based on operation performed on the operation screen 50. The controller 300 outputs the generated first and second correction values to the first projector 100A, and outputs the generated third and fourth correction values to the second projector 100B.

The aforementioned embodiment has been described with reference to the case where the manual color adjustment is performed after the automatic color adjustment is performed, and when the operator determines that the manual color adjustment is unnecessary after the automatic color adjustment is performed, the manual color adjustment may be omitted. In this case, the control section 150A causes the storage 160 to store a flag indicating that the manual color adjustment has been omitted. When the storage 160 stores the flag indicating that the manual color adjustment has been omitted, the control section 150A executes the process in step S44 shown in FIG. 7, and then transitions to the action in step S47 without performing the evaluation in step S45.

In the embodiment described above, an attachment section 911 of the camera 200 is disposed as part of the optical system unit 400, but an embodiment of the present disclosure is not limited thereto. The attachment section 911 of the camera 200 only needs to be disposed as part of the projector 100.

The present embodiment has been described with reference to the case where a light modulator 112 includes transmissive liquid crystal panels 115 as light modulation devices, but the embodiment of the present disclosure does not necessarily employ the configuration described above. The light modulation devices may each be a reflective liquid crystal panel or a digital micromirror device.

The functional portions shown in FIG. 2 each represent a functional configuration and are each not necessarily implemented in a specific form. That is, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware may be achieved by software. In addition, the specific detailed configuration of each of the other portions in the projector 100 and the camera 200 can be changed in any manner to the extent that the change does not depart from the intent of the present disclosure.

In a case where the color adjustment method and the program are achieved by a computer incorporated in the projector 100, the program executed by the computer can be configured in the form of a recording medium or a transmission medium that transmits the program. The recording medium can be a magnetic or optical recording medium or a semiconductor memory device. Specific examples of the recording medium may include a flexible disk, an HDD (hard disk drive), a CD-ROM, a DVD, a Blu-ray Disc, a magneto-optical disk, a flash memory, and a portable or immobile recording medium, such as a card-shaped recording medium. The recording medium described above may instead be a RAM, a ROM, an HDD, or any other nonvolatile storage device that is an internal storage device incorporated in a server apparatus. Blu-ray is a registered trademark.

5. Summary of Present Disclosure

The present disclosure will be summarized below as additional remarks.

Additional Remark 1

A color adjustment method including executing a first process of determining, based on the result of capture of a first image projected by a first projector and a second image projected by a second projector, a first correction value used to correct the color of the first image, executing a second process including accepting first operation of correcting the color of a third image produced by correcting the first image with the first correction value and projected by the first projector, and determining, based on the result of the first operation, a second correction value used to correct the color of the third image, updating the first correction value by executing the first process again when a setting condition set in advance is satisfied, and outputting the first correction value updated by executing the first process again, and the second correction value.

The color of the first image projected by the first projector can thus be corrected by using the first correction value updated when the setting condition set in advance is satisfied and the second correction value determined based on the result of the operation performed by the operator. It is therefore unnecessary to manually adjust the color whenever the process of matching the color of the first image projected by the first projector to the color of the second image projected by the second projector is executed.

Additional Remark 2

The color adjustment method described in the additional remark 1, in which the first process includes determining a third correction value used to correct the color of the second image, and the second process includes accepting second operation of correcting the color of a fourth image produced by correcting the second image with the third correction value and projected by the second projector, and determining a fourth correction value used to correct the color of the fourth image based on the result of the second operation.

The operator can thus determine the fourth correction value, which is used to correct the color of the second image projected by the second projector, by performing operation while visually checking the second image. The fourth correction value used to correct the color of the second image can therefore be determined with the result of the visual checking of the second image reflected.

Additional Remark 3

The color adjustment method described in the additional remark 1 or 2, in which the updating of the first correction value is determining that the setting condition is satisfied when a setting period set in advance elapses.

The first process is thus executed whenever the setting period set in advance elapses to update the first correction value. The first correction value can therefore be so updated whenever the set period elapses that the first correction value corresponds to the conditions under which the first projector is installed.

Additional Remark 4

The color adjustment method described in the additional remark 1 or 2, in which the updating of the first condition value is determining that the setting condition is satisfied when an instruction of executing the first process again is accepted.

The first process is therefore executed again when the instruction of executing the first process again is externally input to update the first correction value. The first process can therefore be executed again in response to the external instruction to update the first correction value.

Additional Remark 5

The color adjustment method described in the additional remark 1 or 2, in which the executing of the second process includes displaying a user interface that accepts the first operation, and the accepting of the first operation includes accepting the first operation via the user interface.

The second correction value can thus be determined based on the operation performed by the operator on the user interface.

Additional Remark 6

The color adjustment method described in the additional remark 2, in which the executing of the second process includes displaying a user interface that accepts the second operation, and the accepting of the second operation includes accepting the second operation via the user interface.

The fourth correction value can thus be determined based on the operation performed by the operator on the user interface.

Additional Remark 7

The color adjustment method described in any one of the additional remarks 1 to 6, in which the executing of the first process includes determining the first correction value based on a first captured image produced by causing the first projector to project the first image and capturing an image of a projection surface onto which the second projector does not project the second image, and a second captured image produced by not causing the first projector to project the first image and capturing an image of the projection surface onto which the second projector projects the second image.

The first correction value is thus determined based on the captured image produced by capturing an image of the projection surface on which the first image has been projected but the second image has not been projected and the captured image produced by capturing an image of the projection surface on which the first image has not been projected but the second image has been projected. The first correction value can thus be accurately determined based on the captured images.

Additional Remark 8

A projector including an optical apparatus, an imaging apparatus, and at least one processor, the at least one processor executing a first process of determining, based on the result of capture of a first image projected by the optical apparatus and a second image projected by another projector, a first correction value used to correct the color of the first image, accepting first operation of correcting the color of a third image produced by correcting the first image with the first correction value and projected by the optical apparatus, executing a second process of determining, based on the result of the first operation, a second correction value used to correct the color of the third image, updating the first correction value by executing the first process again when a setting condition set in advance is satisfied, and outputting the first correction value updated by executing the first process again and the second correction value.

The color of the first image projected by the first projector can thus be corrected by using the first correction value updated when the setting condition set in advance is satisfied and the second correction value determined based on the result of the operation performed by the operator. It is therefore unnecessary to manually adjust the color whenever the process of matching the color of the first image projected by the first projector to the color of the second image projected by the second projector is executed.

Additional Remark 9

A program that causes a computer to execute a first process of determining, based on the result of capture of a first image projected by a first projector and a second image projected by a second projector, a first correction value used to correct the color of the first image, accept first operation of correcting the color of a third image produced by correcting the first image with the first correction value and projected by the first projector, execute a second process of determining, based on the result of the first operation, a second correction value used to correct the color of the third image, update the first correction value by executing the first process again when a setting condition set in advance is satisfied, and output the first correction value updated by executing the first process again and the second correction value.

The color of the first image projected by the first projector can thus be corrected by using the first correction value updated when the setting condition set in advance is satisfied and the second correction value determined based on the result of the operation performed by the operator. It is therefore unnecessary to manually adjust the color whenever the process of matching the color of the first image projected by the first projector to the color of the second image projected by the second projector is executed.

What is claimed is:

1. A color adjustment method comprising:

executing a first process of determining, based on a result of capture of a first image projected by a first projector and a second image projected by a second projector, a first correction value used to correct a color of the first image, the first correction value being generated by automatic color adjustment;

executing a second process including accepting, from a user, first operation indicating user input of correcting a color of a test pattern produced by correcting the first image with the first correction value and projected by the first projector, and determining, based on a result of the first operation, a second correction value used to correct the color of the test pattern, the second correction value being generated by manual color adjustment;

updating the first correction value by executing the automatic color adjustment in the first process again when a setting condition set in advance is satisfied; and outputting, to image processing hardware, the first correction value updated by executing the automatic color adjustment in the first process again, and the second correction value generated by the manual color adjustment.

2. The color adjustment method according to claim 1, wherein the first process includes determining a third correction value used to correct a color of the second image, and the second process includes accepting second operation of correcting a color of a corrected second image produced by correcting the second image with the third correction value and projected by the second projector, and determining a fourth correction value used to correct the color of the corrected second image based on a result of the second operation.

3. The color adjustment method according to claim 2, wherein the executing of the second process includes displaying a user interface that accepts the second operation, and the accepting of the second operation includes accepting the second operation via the user interface.

4. The color adjustment method according to claim 1, wherein the updating of the first correction value is determining that the setting condition is satisfied when a setting period set in advance elapses.

5. The color adjustment method according to claim 1, wherein the updating of the first condition value is determining that the setting condition is satisfied when an instruction of executing the first process again is accepted.

6. The color adjustment method according to claim 1, wherein the executing of the second process includes displaying a user interface that accepts the first operation, and the accepting of the first operation includes accepting the first operation via the user interface.

7. The color adjustment method according to claim 1, wherein the executing of the first process includes determining the first correction value based on a first captured image produced by causing the first projector to project the first image and capturing an image of a projection surface onto which the second projector does not project the second image, and a second captured image produced by not causing the first projector to project the first image and capturing an image of the projection surface onto which the second projector projects the second image.

8. A projector comprising:

an optical apparatus;

an imaging apparatus; and at least one processor, wherein the at least one processor executes a first process of determining, based on a result of capture of a first image projected by the optical apparatus and a second image projected by another projector, a first correction value generated by automatic color adjustment and used to correct a color of the first image, executes a second process including accepting first operation including user input of correcting a color of a test pattern produced by correcting the first image with the first correction value and projected by the optical apparatus, and determining, based on a result of the first operation, a second correction value generated by manual color adjustment is used to correct the color of the test pattern, updates the first correction value by executing the first process again when a setting condition set in advance is satisfied, and outputs, to image processing hardware, the first correction value updated by executing the first process again and the second correction value.

9. The projector according to claim 8, wherein the first process includes determining a third correction value used to correct a color of the second image, and the second process includes accepting second operation of correcting a color of a corrected second image produced by correcting the second image with the third correction value and projected by the second projector, and determining a fourth correction value used to correct the color of the corrected second image based on a result of the second operation.

10. The color adjustment method according to claim 9, wherein the executing of the second process includes displaying a user interface that accepts the second operation, and the accepting of the second operation includes accepting the second operation via the user interface.

11. The projector according to claim 8, wherein the updating of the first correction value is determining that the setting condition is satisfied when a setting period set in advance elapses.

12. The projector according to claim 8, wherein the updating of the first condition value is determining that the setting condition is satisfied when an instruction of executing the first process again is accepted.

13. The projector according to claim 8, wherein the executing of the second process includes displaying a user interface that accepts the first operation, and the accepting of the first operation includes accepting the first operation via the user interface.

14. The projector according to claim 8, wherein the executing of the first process includes determining the first correction value based on a first captured image produced by causing the first projector to project the first image and capturing an image of a projection surface onto which the second projector does not project the second image, and a second captured image produced by not causing the first projector to project the first image and capturing an image of the projection surface onto which the second projector projects the second image.

15. A non-transitory computer-readable storage medium storing a program that causes a computer to execute a first process of determining, based on a result of capture of a first image projected by a first projector and a second image projected by a second projector, a first correction value generated by automatic color adjustment and used to correct a color of the first image, execute a second process including accepting first operation including user input of correcting a color of a test pattern produced by correcting the first image with the first correction value and projected by the first projector, and determining, based on a result of the first operation, a second correction value generated by manual color adjustment is used to correct the color of the test pattern, update the first correction value by executing the first process again when a setting condition set in advance is satisfied, and output, to image processing hardware, the first correction value updated by executing the first process again and the second correction value.

16. The non-transitory computer-readable storage medium according to claim 15, wherein the first process includes determining a third correction value used to correct a color of the second image, and the second process includes accepting second operation of correcting a color of a corrected second image produced by correcting the second image with the third correction value and projected by the second projector, and determining a fourth correction value used to correct the color of the corrected second image based on a result of the second operation.

17. The color adjustment method according to claim 16, wherein the executing of the second process includes displaying a user interface that accepts the second operation, and the accepting of the second operation includes accepting the second operation via the user interface.

18. The non-transitory computer-readable storage medium according to claim 15, wherein the updating of the first correction value is determining that the setting condition is satisfied when a setting period set in advance elapses.

19. The non-transitory computer-readable storage medium according to claim 15, wherein the updating of the first condition value is determining that the setting condition is satisfied when an instruction of executing the first process again is accepted.

20. The non-transitory computer-readable storage medium according to claim 15, wherein the executing of the second process includes displaying a user interface that accepts the first operation, and the accepting of the first operation includes accepting the first operation via the user interface.

* * * * *